US012789944B2

(12) United States Patent
Mills

(10) Patent No.: US 12,789,944 B2
(45) Date of Patent: Nov. 10, 2026

(54) CHILD RIDE-ON VEHICLE

(71) Applicant: Anthony Dupree Mills, Burnsville, MN (US)

(72) Inventor: Anthony Dupree Mills, Burnsville, MN (US)

( * ) Notice: Subject to any disclaimer, the term of this patent is extended or adjusted under 35 U.S.C. 154(b) by 524 days.

(21) Appl. No.: 18/468,319

(22) Filed: Sep. 15, 2023

(65) Prior Publication Data

US 2024/0101222 A1 Mar. 28, 2024

Related U.S. Application Data

(60) Provisional application No. 63/409,241, filed on Sep. 23, 2022.

(51) Int. Cl.

*B62M 7/02* (2006.01)
*B62J 45/41* (2020.01)
*B62J 45/42* (2020.01)
*B62K 11/04* (2006.01)

(52) U.S. Cl.

CPC ................ *B62M 7/02* (2013.01); *B62J 45/41* (2020.02); *B62J 45/42* (2020.02); *B62K 11/04* (2013.01)

(58) Field of Classification Search

CPC .............. B62J 27/00; B62J 45/41; B62K 9/00
See application file for complete search history.

(56) References Cited

U.S. PATENT DOCUMENTS 3,751,851 A * 8/1973 Nagai .................... A63H 17/40 446/440
6,575,260 B2 * 6/2003 Bourget ............... B62K 25/283 180/227
7,311,567 B2 * 12/2007 Gibbs ...................... B62K 9/00 440/12.5
7,503,828 B2 * 3/2009 Lee ........................ A63H 17/36 446/460
7,530,411 B2 5/2009 Huntsberger et al.
7,717,214 B2 * 5/2010 Gilbert .................. B62K 11/04 180/228
9,150,273 B2 * 10/2015 Baron ....................... B62B 1/12
10,668,971 B2 * 6/2020 Denholm ................. B62J 45/41
11,198,399 B2 * 12/2021 Gindin ..................... B62J 99/00

(Continued)

FOREIGN PATENT DOCUMENTS

CN 109515601 A * 3/2019 ............. B62K 21/00
JP 2014532007 A * 12/2014 ........... B62K 25/005

(Continued)

*Primary Examiner* — Minnah L Seoh
*Assistant Examiner* — Hosam Shabara
(74) *Attorney, Agent, or Firm* — Westman, Champlin & Koehler, P.A.

(57) ABSTRACT

A child ride-on vehicle includes a front wheel, a rear wheel displaced in a rearward direction from the front wheel, a frame connected to the front and rear wheels, a steering mechanism configured to facilitate steering the front wheel relative to the frame, a steering interface configured to control the steering mechanism, a seat connected to the frame and configured to support a user in a driving position for interaction with the steering interface, and a rear camera. The rear camera is supported by the frame and has a viewing angle that is oriented in the rearward direction and away from a user in the driving position, and in an upward direction that is transverse to a longitudinal axis of the vehicle.

10 Claims, 4 Drawing Sheets

(56) References Cited

U.S. PATENT DOCUMENTS

| | | | | | |
|---|---|---|---|---|---|
| 11,487,122 | B1 * | 11/2022 | Boone | B63B 49/00 | |
| 11,524,738 | B2 * | 12/2022 | Saeki | B62J 45/41 | |
| 12,371,120 | B2 * | 7/2025 | Inkirev | B60K 7/0007 | |
| 2011/0295454 | A1 * | 12/2011 | Meyers | B62J 43/16 | 180/219 |
| 2015/0228066 | A1 * | 8/2015 | Farb | G06V 20/58 | 348/148 |
| 2016/0014377 | A1 * | 1/2016 | Fiegert | F16M 13/02 | 348/148 |

FOREIGN PATENT DOCUMENTS

| | | | | |
|---|---|---|---|---|
| WO | WO-2016110230 | A1 * | 7/2016 | B62M 7/02 |
| WO | WO-2022201836 | A1 * | 9/2022 | B62J 45/00 |

* cited by examiner

CHILD RIDE-ON VEHICLE

CROSS-REFERENCE TO RELATED APPLICATION

The present application is based on and claims the benefit of U.S. provisional patent application Ser. No. 63/409,241, filed Sep. 23, 2022, the content of which is hereby incorporated by reference in its entirety.

BACKGROUND

Child ride-on vehicles generally take the form of three-wheeled or four-wheeled vehicles that are typically powered by an electric motor and can accommodate one or two children riders who may drive the vehicle around. Such vehicles often take the form of scaled-down versions of full-size vehicles.

There are numerous safety concerns with such vehicles, such as the stability of the vehicles. Most four-wheeled child ride-on vehicles are generally stabilized by the spacing of the wheels. As a result, such vehicles do not generally have tipping issues.

However, child ride-on vehicles representing motorcycles are difficult to scale down to a form that is suitable for children who lack the required balancing skills to safely ride a two-wheeled vehicle while maintaining the appearance of a motorcycle. Such child ride-on motorcycles must generally maintain an upright position without tipping during normal operation by a child. Such stabilization has been accomplished by adding supporting wheels beyond the traditional front and rear wheel of the motorcycle. For example, U.S. Pat. No. 7,530,411 discloses a child ride-on motorcycle that utilizes additional supporting wheels, such as a wheel of a sidecar and wheels located between the front and rear wheels, to stabilize the vehicle for child operation. While attempts to hide such stabilizing wheels are made, their presence cannot be completely hidden and results in three-wheeled or four-wheeled child ride-on vehicle rather than a two-wheeled child ride-on vehicle.

The operation of child ride-on vehicles can allow a child to travel away from the watching eyes of parents, guardians, and friends. This may present an opportunity for an abductor to grab the child from the vehicle without being seen.

SUMMARY

Embodiments of the present disclosure relate to a child ride-on vehicle having one or more unique features over conventional child ride-on vehicles that address issues described above.

One embodiment relates to a child ride-on vehicle that includes a front wheel, a rear wheel displaced in a rearward direction from the front wheel, a frame connected to the front and rear wheels, a steering mechanism configured to facilitate steering the front wheel relative to the frame, a steering interface configured to control the steering mechanism, a seat connected to the frame and configured to support a user in a driving position for interaction with the steering interface, and a rear camera. The rear camera is supported by the frame and has a viewing angle that is oriented in the rearward direction and away from a user in the driving position, and in an upward direction that is transverse to a longitudinal axis of the vehicle.

Another embodiment relates to a two-wheeled child ride-on vehicle that includes a front wheel configured to rotate about a first axis, a rear wheel displaced in a rearward direction from the front wheel and configured to rotate about a second axis, a frame connected to the front and rear wheels, a steering mechanism configured to facilitate rotation of the front wheel about a steering axis relative to the frame, a steering interface configured to control the steering mechanism, and a seat connected to the frame and configured to support a user in a driving position for interaction with the steering interface. The front and rear wheels are substantially centered on a longitudinal axis, which extends through and perpendicularly to the first and second axes. A width of the front wheel measured along the first axis is 5 or more inches, and a width of the rear wheel measured along the second axis is 12 or more inches.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
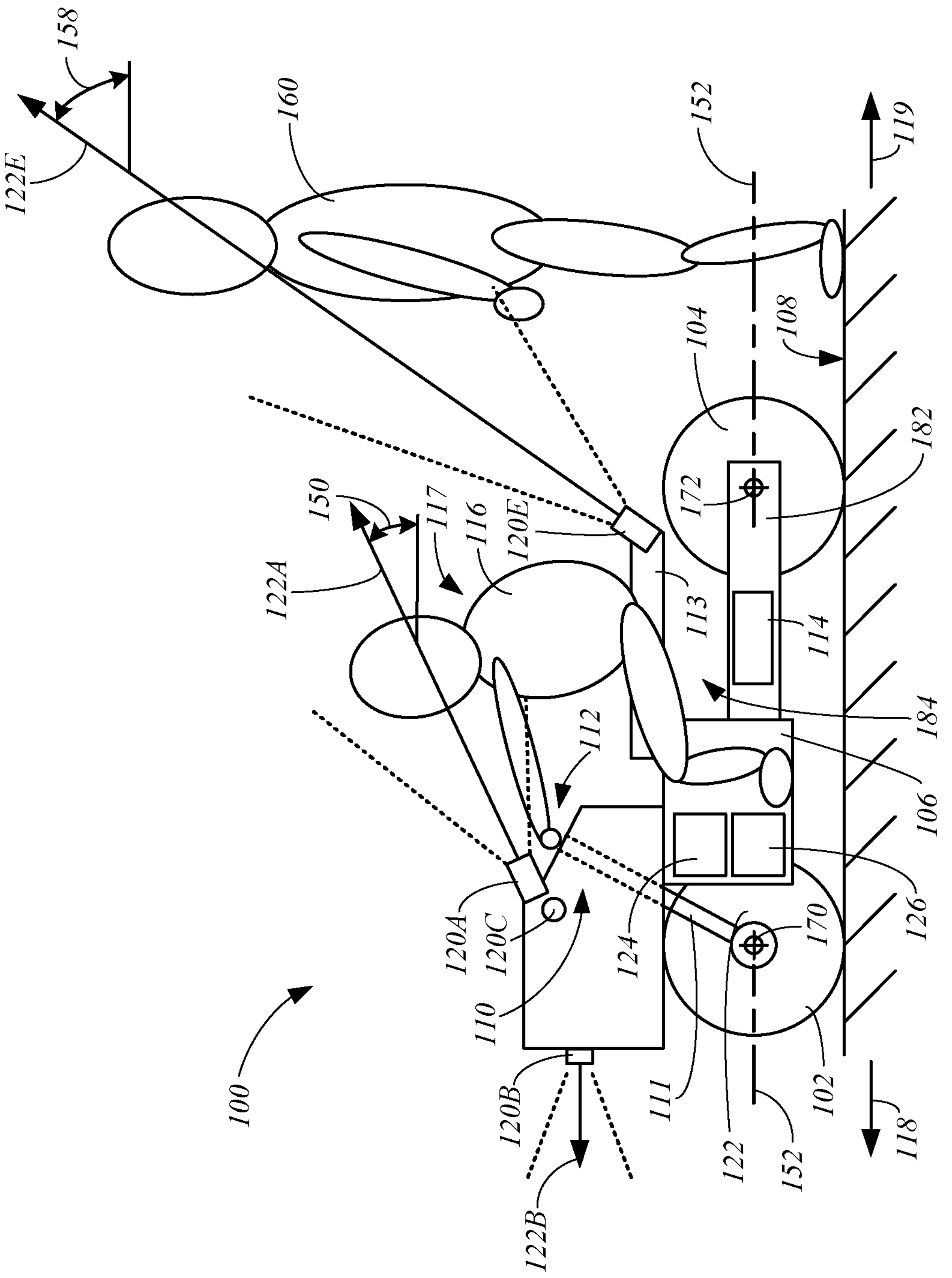
FIG. 1 is a simplified side view of a child ride-on vehicle, in accordance with various embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Functions recited herein may be performed using a single controller, multiple controllers, or at least one controller. As used herein, when one or more functions are described as being performed by "a controller," such as a specific controller, one or more controllers, or at least one controller, embodiments include the performance of the function(s) by a single controller or processor or multiple controllers or processors, unless otherwise specified. Furthermore, as used herein, when multiple functions are performed by at least one controller, all of the functions may be performed by a single controller, or some functions may be performed by one controller and other functions may be performed by another controller. Thus, the performance of one or more functions by at least one controller does not require that all of the functions are performed by each of the at least one controllers.

Embodiments of the present disclosure relate to a child ride-on vehicle having one or more unique features over conventional child ride-on vehicles. Such features include cameras having various views for capturing images and/or video of a child driving the vehicle and scenes around the vehicle, a two-wheeled self-balancing vehicle configuration, and other features.

Figure 2:
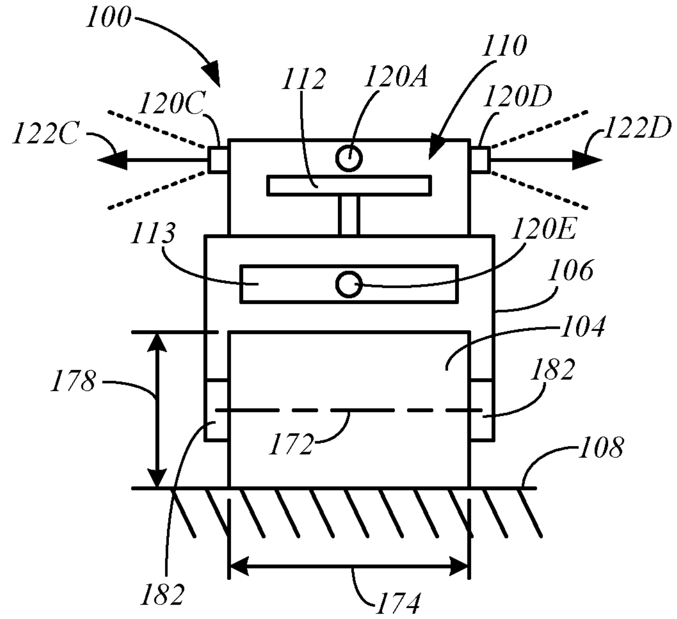
FIG. 2 is a simplified rear view of the vehicle of FIG. 1, in accordance with embodiments of the present disclosure.
Figure 3:
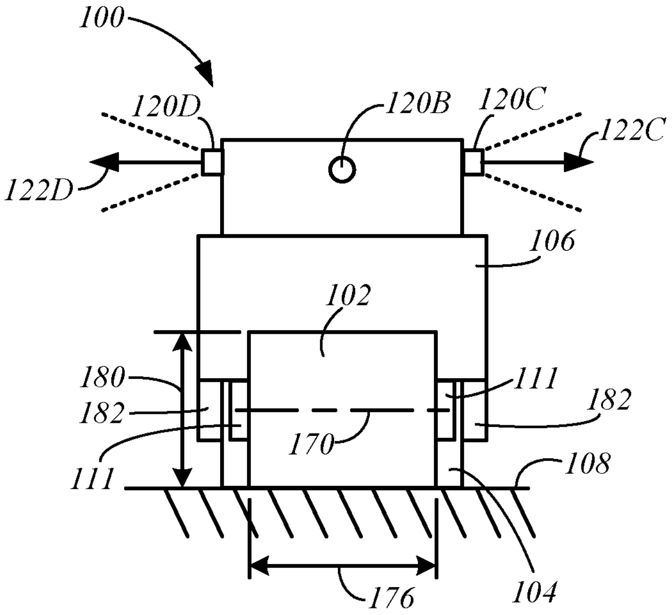
FIG. 3 is a simplified front view of the vehicle of FIG. 1, in accordance with embodiments of the present disclosure.
Figure 4:
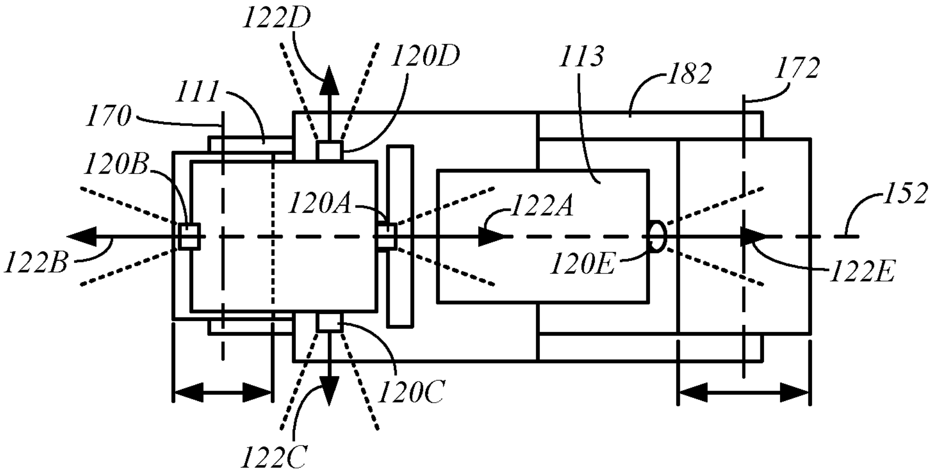
FIG. 4 is a simplified top view of the vehicle of FIG. 1, in accordance with embodiments of the present disclosure.

FIG. 1 is a simplified side view of a child ride-on vehicle 100 (hereinafter "vehicle"), in accordance with various embodiments of the present disclosure. FIGS. 2, 3 and 4 respectively are simplified rear, front and top views of the vehicle 100, in accordance with embodiments of the present disclosure.

The vehicle 100 generally includes one or more front wheels 102 and one or more rear wheels 104 that are respectively connected to a vehicle frame 106. The wheels 102 and 104 support the frame 106 for rolling the vehicle over a ground surface 108. Thus, while the vehicle 100 is illustrated in the drawings as having only a single front wheel 102 and a single rear wheel 104, it is understood that some embodiments of the present disclosure may be used with the vehicle 100 having a more conventional wheel configuration, such as two front wheels 102 and one or more rear wheels 104, or one or more front wheels 102 and two rear wheels 104, for example, as found in child ride-on vehicles of the prior art, such as that disclosed in the above-referenced patent.

The vehicle 100 includes a steering mechanism 110 that is connected to the front wheel or wheels 102 through a support or fork 111 and a steering interface 112. The steering mechanism 110 and the steering interface 112 (e.g., handlebars) may take on conventional forms.

The vehicle 100 also includes a seat 113 that is connected to the frame 106 and is configured to support a user 116 in a driving position 117 for interaction with the steering interface 112, as indicated in FIG. 1. A child in the driving position 117 may use the steering interface 112 to control the steering mechanism 110 and steer the vehicle 100 in a desired direction. The frame may also include supports for the user's feet.

At least one of the wheels 102 and 104 may be rotatably driven through a suitable drive mechanism 114 to propel the vehicle 100 along the surface 108 in a forward direction 118 and possibly a rearward direction 119, as indicated in FIG. 1. The drive mechanism 114 may be a manual drive mechanism or a motorized drive mechanism. One example of a manual drive mechanism 114 comprises a conventional pedal drive mechanism, such as that used by a bicycle or a tricycle. Here, the child 116 (FIG. 1) may use his/her feet and legs to propel the vehicle 100 along the surface 108.

Examples of motorized drive mechanisms 114 include electrical motors or combustion engines. Such motorized drive mechanisms may be mechanically linked to one or more of the wheels 102 and 104, such as the rear wheel or wheels 104, using conventional techniques, to drive the wheels and propel the vehicle 100. A throttle or another suitable controller for the motorized drive mechanism 114 may be used by the driver to control the activation of the motor or engine, the power applied to the wheel or wheels through the motorized drive mechanism 114, and/or the direction the wheel or wheels are driven by the motorized drive mechanism 114.

In some embodiments, the vehicle 100 includes one or more cameras, generally designated as 120, that operate to capture images and/or video (images and audio). Each of the cameras 120 may be conventional camera units (e.g., digital cameras) that operate in a conventional manner. The one or more cameras 120 may each have a different viewing angle 122 for capturing a unique scene. As used herein, the viewing angle 122 of each camera 120 is aligned with an axis extending perpendicularly from the center of the lens of the camera 120, as indicated in FIGS. 1-4, and generally corresponds to the center of the image captured by the camera 120.

In some examples, the cameras 120 include a rider camera 120A having a viewing angle 122A that faces in the rearward direction 119 to capture the rider 116 in the driving position 117 (FIG. 1), a front camera 120B having a viewing angle 122B that faces in the forward direction 118 to capture the path along which the vehicle 100 is traveling, a left side camera 120C having a viewing angle 122C that faces out to the left of the rider 116, a right side camera 120D having a viewing angle 122D that faces out to the right of the rider 116 and/or a rear camera 120E having a viewing angle 122E that faces in the rearward direction 119 to capture scenes behind the rider 116 and the vehicle 100. Embodiments of these cameras will be described in greater detail below.

Figure 5:
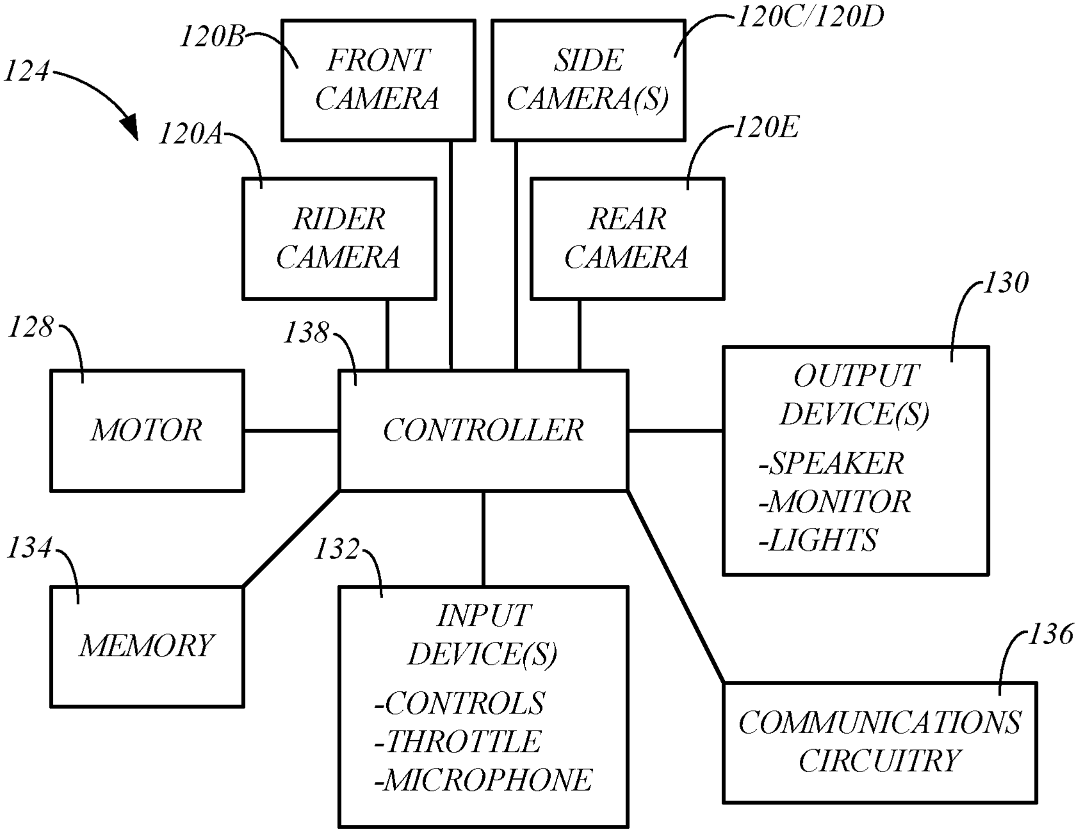
FIG. 5 is a simplified block diagram of the vehicle electronics, in accordance with embodiments of the present disclosure.

In some embodiments, the vehicle 100 comprises vehicle electronics 124 that are powered by a battery 126 supported by the frame 106, as indicated in FIG. 1. FIG. 5 is a simplified block diagram of the vehicle electronics 124 in accordance with embodiments of the present disclosure. Embodiments of the vehicle electronics 124 include the one or more cameras 120, such as cameras 120A-E, an electric motor 128 that forms a portion of the motorized drive mechanism 114, one or more output devices 130, one or more input devices 132, memory 134, communications circuitry 136 and/or at least one controller 138 (hereinafter "controller 138").

Figure 6:
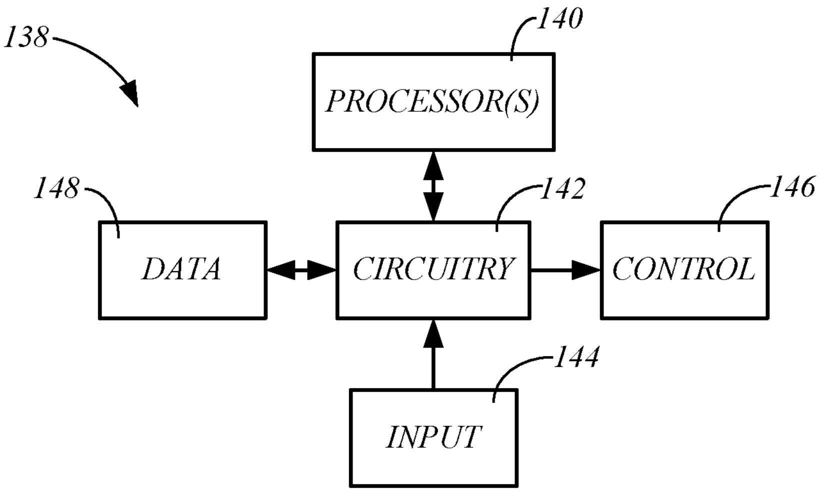
FIG. 6 is a simplified block diagram of an example of the controller, in accordance with embodiments of the present disclosure.

The controller 138 is configured to perform various functions described herein, such as the control of the drive mechanism 114, and the one or more cameras 120, for example. FIG. 6 is a simplified block diagram of an example of the controller 138, in accordance with embodiments of the present disclosure.

The controller 138 includes one or more processors 140 (e.g., a central processing unit) that perform various control functions in response to the execution of instructions, which may be stored in the memory 134 (FIG. 5) of the vehicle electronics 124. The memory 134 represents local and/or remote memory or computer-readable media. Such memory 134 comprises any suitable patent subject matter eligible computer-readable media that do not include transitory waves or signals such as, for example, hard disks, CD-ROMs, optical storage devices, and/or magnetic storage devices. The one or more processors 140 of the controller 138 may be components of one or more computer-based systems, and may include one or more control circuits, microprocessor-based engine control systems, and/or one or more programmable hardware components, such as a field programmable gate array (FPGA).

The controller 138 may include circuitry 142 for use by the one or more processors 140 to receive input signals 144 (e.g., from the cameras 120, the input devices 132, the communications circuitry 136, etc.), issue control signals 146 (e.g., to the output devices 130, motor 128, etc.), and/or or communicate data 148 through the communications circuitry 136, such as in response to the execution of the instructions stored in the memory 134, for example.

The output devices 130 of the electronics 124 may include a speaker for outputting sounds (e.g., vehicle sounds, a horn, music, etc.), lights, and/or other output devices, as indicated in FIG. 5. In some embodiments, the output devices 130 include a monitor for viewing images (e.g., images captured by the one or more cameras 120), for use as an input device 132 (e.g., touchscreen), for viewing vehicle menus and information, or for other uses.

The input devices 132 of the electronics 120 may include controls (e.g., buttons, switches, slides, knobs, etc.) that may be used to control one or more of the output devices 130 and vehicle functions, as indicated in FIG. 5. For example, a power button may be used to power the vehicle 100 on or off, a horn button may cause the speaker to produce a horn sound, a switch may be used to turn on or off the lights, a knob may be used to control a volume of the sound output from the speaker, etc.

The input devices 132 may include a throttle for controlling the motor 128. Examples of the throttle may include a mechanism for inputting a power level of the motor 128 or a speed of the vehicle 100 to the controller 138, such as a handlebar input device (e.g., lever, rotatable handle, etc.) or a foot pedal input device. The one or more cameras 120 also constitute input devices that are configured to capture images and/or video and store the captured images or video in the memory 134.

In some embodiments, the communications circuitry 136 is configured to receive and/or transmit data using a conventional wired or wireless data communication protocol, such as Ethernet, Wi-Fi, Bluetooth®, Near-Field Communications (NFC), etc. In some embodiments, the communications circuitry 136 is configured to allow a user to use their phone or another computing device to control aspects of the electronics 124, view a live broadcast of images captured using one or more of the cameras 120, download images and/or video files stored in the memory 134, activate or deactivate the vehicle 100, control a maximum speed or motor power of the vehicle 100, check a level of the battery 126, and/or perform other operations.

As mentioned above, each of the cameras 120 has a corresponding viewing angle 122 that allows it to capture a unique scene. In some embodiments, each camera 120 may be activated (begins the capture of video and/or images) when the vehicle 100 is turned on and deactivated when the vehicle 100 is turned off. Alternatively, the cameras 120 may be triggered when a throttle input device is activated (triggers motor 128 to propel the vehicle) by the rider 116. The cameras 120 may also be activated in response to a threshold level of noise captured by one of the cameras 120 or a separate microphone input device 132, or a threshold level of vibration or movement detected by a motion sensor input device, for example. The triggered activation of the cameras 120 may cause them to capture an image and/or record video for a predetermined period of time (e.g., 30 seconds).

The cameras 120 may also be activated through an application executed on a user's computing device (e.g., smartphone, etc.). Thus, a parent may control the rider camera 120A to capture images or video of their child riding the vehicle 100, and/or download images or video stored in the memory 134.

In some embodiments, the rider camera 120A is supported by the frame or body 106 in front of the child rider 116, such as near the steering interface 112 (e.g., above the handlebars), as shown in FIGS. 1 and 4. The viewing angle 122A of the rider camera 120A may be oriented at an angle 150 relative to a longitudinal axis 152 of the vehicle 100, which may be substantially (+/−5 degrees) parallel to the surface 108, to capture the face and upper torso of the child rider 116, as shown in FIG. 1. For example, the rider camera 120A may be oriented at an angle 150 of 20-70 degrees relative to the surface 108 or the longitudinal axis 152.

The front camera 120B has a viewing angle 122B that faces in the forward direction 118 and may be generally parallel with the longitudinal axis 152 and the surface 108, as indicated in FIGS. 1 and 4. Thus, the camera 120B is configured to capture video and/or images in front of the vehicle 100.

The side cameras 120C and 120D respectively have a left side-facing viewing angle 122C and a right side-facing viewing angle 122D, which are perpendicular to the longitudinal axis, as indicated in FIGS. 2-4. In some embodiments, the viewing angles 122C and 122D are generally parallel to the surface 108.

In some embodiments, the viewing angle 122E of the rear camera 120E is oriented in the rearward direction 119 and is configured to capture a rear view from the vehicle 100 behind the driver 116. In some embodiments, the viewing angle 122E of the rear camera 120E is oriented at an angle 158 to the longitudinal axis 152 or the surface 108, as shown in FIG. 1. The upwardly facing viewing angle 122E is necessary to capture the face of an adult located immediately behind the vehicle 100 due to the height of the adult relative to the vehicle 100. In some embodiments the angle 158 is within a range of 30-80 degrees, such as 55-70 degrees. This embodiment of the rear camera 120E may be used to capture images of an adult 160 viewing or assisting the rider 116 of the vehicle 100.

The rear camera 120E provides a security feature by being configured to capture images of adults 160 that approach the vehicle 100 from behind. If, for example, an adult 160 attempts to abduct a child 116 riding the vehicle 100 from behind, the rear camera 120E may capture images of the abduction including the abductor's face due to its upward angle 158. Thus, the rider camera 120E may capture critical images and video of an abduction.

Additional embodiments relate to a two-wheeled child ride-on vehicle 100 in the form of a motorcycle. As used herein, the "two-wheeled" motorcycle version of the vehicle 100 means that the vehicle 100 is stabilized in the vertical orientation relative to the surface 108 (FIGS. 1-4) using only two substantially cylindrical wheels: a front wheel 102 and a rear wheel 104. Thus, in some embodiments, the two-wheeled vehicle 100 lacks additional wheels that are typically used to vertically stabilize such child ride-on motorcycles (see, e.g., U.S. Pat. No. 7,530,411).

The front wheel 102 is configured to rotate about an axis 170 and the rear wheel 104 is configured to rotate about an axis 172. In some embodiments, the longitudinal axis 152 is perpendicular to and extends through the axes 170 and 172.

The cylindrical front wheel 102 and the cylindrical rear wheel 104 create a wide platform on which the frame 106 of the vehicle 100 and the rider 116 is supported. The extra-wide width of the wheels 102 and 104 stabilizes the vehicle 100 in the vertical orientation by ensuring that the center of gravity is well within the outer edges of the wheels 102 and 104 during normal operation, thereby reducing the risk of tipping over most surfaces 108 as compared to a vehicle using conventional front and rear wheels and without additional support wheels. Accordingly, the wheels 102 and 104 form a stable platform for the two-wheeled vehicle 100 that render the vehicle 100 highly resistant to tipping under normal use.

The wheels 102 and 104 may have the same or different dimensions. In some embodiments, the rear cylindrical wheel 104 is wider than the front cylindrical wheel 102. For example, the rear wheel 104 may have a width 174 of at least about 12 inches, such as 12-18 inches (e.g., 14 inches), and the front cylindrical wheel 102 has a width 176 of at least 5 inches, such as 6-10 inches (e.g., 8 inches).

The diameter 178 of the rear cylindrical wheel 104 may be the same or different from the diameter 180 of the front cylindrical wheel 102. The diameters 178 and 180 may be in a range of about 6-14 inches. In one embodiment, the diameter 178 of the rear cylindrical wheel 104 is greater than the diameter 180 of the front cylindrical wheel 102. In one example, the diameter 178 is about 10-14 inches (e.g., 12 inches) and the diameter 180 is about 6-12 inches (e.g., 10 inches).

Accordingly, the rear cylindrical wheel 104 may have a width 174 to diameter 178 ratio of 0.8-1.8, such as about 1.3 (±0.2). The front cylindrical wheel 102 may have a width 176 to diameter 180 ratio of 0.4-1.6, such as about 0.8 (±0.2)

The front wheel 102 may be supported by the front fork 111 (FIG. 1) of the steering mechanism 110, and the rear wheel 104 may be supported by a fork 182 of the frame 106. The fork 182 may extend substantially horizontally along the longitudinal axis 152, as shown in FIG. 1.

The front and rear wheels 102 and 104 may be formed using any suitable materials. In some embodiments, the cylindrical wheels 102 and 104 comprise a wheel body formed of plastic or fiberglass and may include an outer layer of rubber or another suitable material that engages the surface 108.

In some embodiments, the seat 113 is cantilevered in the rearward direction 119 above the fork 182, as shown in FIGS. 1, 2 and 4. Thus, a gap 184 exists between the seat and the fork.

Although the embodiments of the present disclosure have been described with reference to preferred embodiments, workers skilled in the art will recognize that changes may be made in form and detail without departing from the spirit and scope of the present disclosure.

What is claimed is:

1. A child ride-on vehicle comprising:

a front wheel configured to rotate about a first axis;

a rear wheel displaced in a rearward direction from the front wheel and configured to rotate about a second axis;

a frame connected to the front and rear wheels;

a steering mechanism configured to facilitate steering the front wheel relative to the frame;

a steering interface configured to control the steering mechanism;

a seat connected to the frame and configured to support a user in a driving position for interaction with the steering interface; and a rear camera supported by the frame and having a viewing angle that is oriented in the rearward direction and away from a user in the driving position, and in an upward direction that is transverse to a longitudinal axis of the vehicle, which extends through and perpendicularly to the first and second axes, and away from a surface on which the vehicle is supported, wherein:

the rear camera includes a lens; and the viewing angle of the rear camera is aligned with a rear camera axis extending perpendicularly from a center of the lens.

2. The vehicle according to claim 1, wherein the viewing angle is oriented approximately 30-80 degrees from the longitudinal axis and the surface.

3. The vehicle according to claim 1, including at least one side camera having a viewing angle that is transverse to the longitudinal axis and faces away from a user in the driving position.

4. The vehicle according to claim 1, including:

a rider camera supported by the frame and having a viewing angle that is oriented to capture a user in the driving position; and/or a front camera having a viewing angle that faces in a forward direction that is opposite the rearward direction and away from a user in the driving position.

5. The vehicle according to claim 1, wherein:

the vehicle is a two-wheeled vehicle; and the front and rear wheels are centered on the longitudinal axis.

6. The vehicle according to claim 5, wherein:

a width of the front wheel measured along the first axis of at least 5 inches; and a width of the rear wheel measured along the second axis of at least 12 inches.

7. The vehicle according to claim 6, wherein:

the width of the front wheel measured along the first axis is 8-10 inches; and the width of the rear wheel measured along the second axis is 14-18 inches.

8. The vehicle according to claim 7, wherein:

the front wheel has a width to diameter ratio of about 0.4-1.6; and the rear wheel has a width to diameter ratio of about 0.8-1.8.

9. The vehicle according to claim 8, wherein:

the front wheel is supported by a front fork of a steering mechanism that is connected to the steering interface;

the frame includes a rear fork that supports the rear wheel and extends in the rearward direction; and the vehicle includes a motor supported by the frame and configured to drive rotation of the front wheel and/or the rear wheel.

10. The vehicle according to claim 8, wherein the front and rear wheels are each formed of plastic or fiberglass.

* * * * *